Patented June 17, 1941

UNITED STATES PATENT OFFICE 2,246,281

LUBRICATING OIL FOR CARRYING HIGH PRESSURES AND METHOD FOR MAKING THE SAME

John C. Zimmer, Hillside, and Arnold J. Morway, Roselle, N. J., assignors to Standard Oil Development Company, a corporation of Delaware No Drawing. Application May 11, 1938, Serial No. 207,306

12 Claims. (Cl. 252—48)

The present invention relates to improved lubricating oils especially for carrying heavy loads and to methods for making such materials. The invention will be fully understood from the following description.

Addition agents for lubricating oils adapted to endow them with the ability to carry heavy loads have been made in the past by treating fatty oils and other reactive organic materials with sulfur or with sulfur halides. In both methods it is necessary to heat for a relatively long period in order to introduce enough sulfur to be effective for the purpose and not crystallize or precipitate on cooling. During the heating, the oil is badly discolored and polymerized to a substantial degree producing a dark viscous product which is soluble in oil only difficultly. If the treatment is not carried out with the greatest care, the product may be totally insoluble and the range of solubility is so slight in any case that any further polymerization such as may occur during use will cause insoluble products to form and be precipitated. Where sulfur alone is used, the product of course contains only sulfur in addition to the carbon and hydrogen, or carbon, hydrogen and oxygen of the initial material, but if sulfur halides are employed, a small amount of halogen is likewise introduced. These ingredients are introduced in chemical combination and are not merely dissolved.

It is found that sulfur halides react with organic materials readily to form unstable materials which on heating evolve hydrogen sulfide and hydrogen chloride. The initial material is preferably an unsaturated fatty oil which reacts with sulfur chloride at the unsaturated bond, with a relatively minor evolution of hydrogen sulfide and hydrogen chloride. Saturated fatty oils may be used but there is a preliminary dehydrogenation, considerably greater quantities of hydrogen sulfide and hydrogen chloride are evolved and the product is less desirable. In either case, where the amount of sulfur chloride is less than about 10% of the organic material being treated, the initial reaction may be accomplished within a sufficiently short time at temperatures from about 150 to 250° F. to avoid darkening or excessive polymerization. The amount of sulfur and chlorine added in this incipient stage of reaction is insufficient to give the oil the high degree of load carrying capacity required for the present day industrial lubricants, but it has been found that if this incipient reaction be followed by straight sulfurization with free sulfur, an additional quantity of sulfur up to about 1%, may be readily added by heating up to but preferably not above 300° F. in a stable form and that the product is capable of carrying the heaviest loads required, for example, in stamping, cutting and other metal working operations, as well as in ordinary extreme pressure lubrication. At the same time, polymerization and darkening of the product is largely avoided. The result of this treatment is that the sulfur content of the oil may be raised to a point which it would be impossible to obtain by the action of either sulfur or sulfur chloride alone without at the same time causing the oil to be greatly thickened and to suffer great loss in color and mineral oil solubility.

The material described above is made from fatty oil alone but it is preferred to use a mixture of fatty oil with mineral oil not only for cheapness but because a better product is obtained. In making this compound the amount of fatty oil used may be less than 10%, even less than 5% of the mineral oil. The amount of sulfur chloride may be greater than before, for example, may be 2 to 4 times the amount of the fatty oil without danger of over-polymerization. Usually about 10% of the total mixture of mineral and fatty oil is sufficient. Temperature conditions are as before, it being rarely necessary to heat above 200 or 225° F. to form the incipient sulfur chloride additional product. The time of heating varies with temperature, but at 150 to 200° F. it is usually less than one hour.

Free sulfur is then added just as in the case where fatty oil alone is used. The reaction is much easier with the sulfur chloride treated oil than with an untreated oil. The amount of sulfur is from .5 to about 1.0% of the total mixture. There is an optimum quantity between these limits at which the best results are obtained. The temperature of heating is from preferably 250 to 350° F. and time required is only a few minutes at 300° F., although it may be considerably longer at lower temperatures. The sulfur is chemically united with the organic material and shows no crystallization or separation on cooling.

The preferred products obtained in the above manner may contain from 90 to 98 parts of mineral oil, 1 to 2 parts of a fatty oil, .4 to 1.5% chlorine, and 2.0 to 3.5% of sulfur. If the viscosity of the mineral oil is of the range of 75 to 150 seconds Saybolt at 100° F., a product of good color may be made with a viscosity not over 200 to 225 seconds Saybolt at 210° F. These products are useful as extreme pressure bearing compounds for automotive transmission and the like, or may be employed as cutting oils, stamping and drawing compounds. Other materials may be incorporated, for example, the products may be solidified with alkali or alkaline earth metal soaps or may be incorporated with heavy metal soaps such as lead naphthenate, sulfonate or the like.

The following examples may be considered to illustrate the method of manufacture and the quality of the oils produced:

Example I

To 92.5 parts of a low cold test lubricating oil, having a viscosity of 100 seconds Saybolt at 100° F., is added 2.5 parts of a good grade lard oil. To this mixture is now added 5 parts of sulphur monochloride while stirring at a temperature of 75 to 80° F. The temperature is gradually raised to 150° F. and at this point the evolution of hydrogen sulfide is noted. A stream of air is then blown through the oil continuously and it is further heated to 200° F. in order to sweep out the hydrogen sulfide and hydrogen chloride as evolved. The time of heating at 200° F. is approximately 2 hours.

The product produced as above, which was still of good color and showed little thickening, was divided into two parts. No. 1 was heated for one-half hour at 250° F., while stirring and blowing with air to remove the remaining traces of hydrogen chloride and hydrogen sulfide, and was then cooled to room temperature. To sample No. 2 was added 0.75% of free sulphur and the mixture was heated to 300° F. and maintained at that temperature for about 15 minutes while stirring and blowing with air. The product was then cooled to room temperature. The inspection of the two oils is as follows:

|  | No. 1 | No. 2 |
|---|---|---|
| Viscosity at 100° F seconds | 157 | 162 |
| Saponification No | 28.5 | 51.2 |
| Chlorine percent | 0.73 | .72 |
| Sulfur do | 1.77 | 2.85 |

On maintaining these oils at 0° F. for 24 hours, only a trace of solid substance had settled.

From the above inspections it will be seen that there has been very little polymerization. The color of both samples is good. The first, while it is perfectly satisfactory for light loads and will carry 11 to 15 weights of the Almen machine, is unsatisfactory for heavy loads since it contains too little sulfur, and sufficient sulfur cannot be added by treatment with sulfur chloride without excessive blackening, polymerization and consequent decrease in oil solubility. Sample No. 2 is an excellent product in every way. The sulfur is highly stable in the sense that it will not settle from the oil and it is found to contain a sufficient amount of sulfur to carry the full 15 weights of the Almen test. It was likewise found to be able to carry the full 15 weights on the same machine when the load was applied under shock loading conditions, which is considerably more severe than the ordinary test. The bearing condition was excellent.

Example II

To 95 parts of a mineral oil having a viscosity of 100 seconds Saybolt at 100° F., is added 5 parts of sulfur monochloride. The temperature was raised to 130° F. while stirring for about 3 hours. This product was then divided into two parts. Sample No. 1 was heated to 250° F., for one-half hour and blown with air to remove hydrochloric acid gas and hydrogen sulfide. The temperature was then dropped to 220° F. and the air blowing was continued for two hours. It was then allowed to cool. To sample No. 2, 1% of free sulfur was added and the mixture heated to 300° F. for one-half hour while stirring and blowing with air. The product was then cooled.

The inspection for these two samples is as follows:

|  | No. 1 | No. 2 |
|---|---|---|
| Viscosity at 100° F | 135.4 | 142.8 |
| Saponification No | 25.6 | 51.2 |
| Sulfur percent | 1.76 | 3.15 |
| Chlorine do | .41 | .41 |
| Sulfur separated (after 24 hours at 0° F.) | Trace | Trace |

Both products were of good color. The first is capable of carrying 15 weights on the Almen machine but only 7 to 9 weights under shock loading conditions. The second sample carried the full 15 weights, when loaded even under the shock loading conditions. The bearing condition with the second oil was superior.

Example III

To 91.5 parts of mineral lubricating oil is added 2.5 parts of lard oil and 5 parts of sulfur monochloride. The mixture is heated to 170° F. which was accomplished in about 6 hours, and at this temperature one part of free sulfur is added and the heating continued with air blowing and stirring for a period of 20 hours. The product had the following inspection:

| Viscosity at 100° F | 192 |
|---|---|
| Per cent sulfur | 3.37 |
| Per cent chlorine | .80 |

The oil carried the full 15 weights of the Almen test when applied under shock loading conditions and showed no separation of sulfur when held for 24 hours at 0° F. It was an excellent cutting oil and gave the work an excellent and very attractive finish.

In shop work where machining of tough metal such as chrome steel and threading or tapping tough metals, such as stainless iron and special castings containing chromium and nickel, this high sulfur content lubricant is particularly advantageous. Other benefits gained over the use of the usual comparatively low sulfur bearing lubricants is the extremely fine finish given to the machined surfaces and prolonged tool life.

Example IV

An actual shop test to show the improvement in tool life and finish is given as follows:

Equipment: #6 x automatic milling machines.
Cutting time: One minute, 45 seconds per piece.
Depth of cut: 0.108".
Material cut: High speed tool steel.
Product: ¼" diameter twist drills.
Operation: Milling two grooves in 0.261" stock.
Test criterion: Tools, or cutters, were run without grinding until:

1. Top of drill rough.
2. Groove rough.
3. Back edge of cutting edge rough.
4. Cutting edge torn.

Summary of results:

| Oil type | Number of hours run or tool life |
|---|---|
| Sulfur monochloride and sulfur treated cutting oil (Example III) | 9.5 |
| Sulfur monochloride treated cutting oil | 7.0 |
| Sulfur treated cutting oil | 4.0 |

The present invention is not to be limited by any theory of the reaction involved nor by the treatment of any particular oil or particular proportions of ingredients, but only by the following claims in which it is desired to claim all novelty inherent in the invention.

We claim:

1. An improved method for producing valuable lubricants comprising bringing a fatty oil into incipient reaction with a sulfur halide, then sulfurizing the material with free sulfur.

2. An improved method for producing valuable lubricants comprising bringing a fatty oil into incipient reaction with sulfur chloride under mild temperature conditions, then sulfurizing the product with free sulfur to form a stable compounded oil.

3. An improved method for producing valuable lubricants comprising bringing an unsaturated fatty oil into reaction with sulfur chloride under mild temperature conditions while only incipient reaction occurs, then sulfurizing the product with free sulfur to yield a stable compounded oil from which sulfur does not settle on cooling.

4. Method according to claim 3, in which the amount of sulfur chloride is a substantial proportion but less than 10% of the fatty oil and temperature for the incipient reaction below about 250° F., and the amount of free sulfur added is a substantial proportion but less than 1% and temperature for sulfurization from about 250 to 300° F.

5. An improved method for producing improved lubricants comprising bringing a mixture of mineral oil with a substantial proportion but less than 10% of a fatty oil into incipient reaction with a sulfur halide, then sulfurizing the product with free sulfur to yield a compounded oil from which there is no substantial separation of sulfur on cooling.

6. Method according to claim 5, in which the amount of fatty oil is a substantial proportion but less than 5% of the mixture, and that of sulfur halide employed a substantial proportion but is not more than 10% of the mixture, at temperatures about from 150 to 250° F. and in which resulfurizing is accomplished with a substantial proportion but not more than 1% free sulfur at temperatures up to about 350° F.

7. Sulfurizing a mixture of about 2.5% of a fatty oil with mineral oil with 5 parts sulfur monochloride at temperatures not over 250° F. while only an incipient reaction is obtained, then resulfurizing this product with from .5 to 1.0% of free sulfur at temperatures from 200 to 350° F.

8. An improved sulfurized product comprising a fatty oil sulfurized incipiently with sulfur halide and resulfurized with free sulfur.

9. An improved sulfurized oil comprising a mixture of mineral lubricating oil containing a substantial proportion but less than 10% of fatty oil, sulfurized incipiently with sulfur chloride, and resulfurized with free sulfur having extreme pressure qualities and stable against sulfur separation on cooling.

10. An improved sulfurized oil comprising a mixture of mineral lubricating oil and a substantial amount but less than 5% of fatty oil sulfurized with sulfur chloride incipiently and resulfurized with free sulfur, the resulting product containing 0.40 to 1.5% Cl, 2.0 to 3.5% sulfur having extreme pressure qualities and staple against separation of sulfur on cooling.

11. An improved oil for carrying high loads comprising from about 90 to 98 parts of a mineral oil base with about 2 to 10 parts of a fatty oil, sulfurized by the action of sulfur and sulfur chloride so as to contain 0.40% to 1.0% of combined chlorine and 2.0 to 3.5% of combined sulfur, and having a viscosity less than twice that of the original mineral oil.

12. An improved oil for carrying high loads comprising about 97.5 parts of a mineral oil having a viscosity between about 75 and 150 seconds Saybolt at 100° F., about 2.5 parts of a fatty oil sulfurized by sulfur and sulfur chloride so as to contain .4 to 1.5% chlorine and 2.0 to 3.5% sulfur in substantially stable form and having a viscosity less than about 200 seconds Saybolt at 210° F.

JOHN C. ZIMMER.
ARNOLD J. MORWAY.